Dec. 14, 1954

C. L. ISBORN 2,697,178

FERRORESONANT RING COUNTER

Filed June 4, 1952

2 Sheets-Sheet 1

INVENTOR:
CARL L. ISBORN

By Mason, Mason & Sheridan
PATENT ATTORNEYS

Dec. 14, 1954

C. L. ISBORN 2,697,178

FERRORESONANT RING COUNTER

Filed June 4, 1952

2 Sheets-Sheet 2

INVENTOR:
CARL L. ISBORN

By Mason, Mason & Sheridan

PATENT ATTORNEYS 2,697,178

FERRORESONANT RING COUNTER

Carl L. Isborn, Hawthorne, Calif., assignor, by mesne assignments, to The National Cash Register Company, a corporation of Maryland Application June 4, 1952, Serial No. 291,709

12 Claims. (Cl. 307—88)

Figure 1:
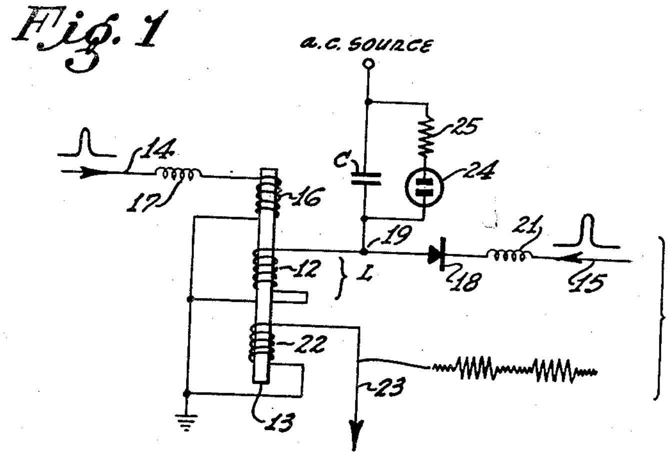

This invention relates to electronic counters and more particularly to a ring counter utilizing ferro-resonant bistable circuit elements.

It has heretofore been the practice to provide high speed electronic counters by interconnecting a plurality of flip-flop or bistable state circuits comprised of vacuum tubes. For example, four such flip-flop circuits, each representing a stage, can be connected in series or cascade so as to count in a binary fashion. When it is desired, for example, to provide a decade counter by this practice, it is necessary to limit, to ten, the unique states assumed by the combination of flip-flop circuits, by means of critical feed-back loops which function to reset the stages. Furthermore, in order to decode and readout the digit content from a counter of this nature, it is necessary to provide output matrices responsive to combinations of outputs of the stages. By the present invention, it is proposed to provide an electronic counter utilizing a plurality of simple, single pathed, bistable state circuits, each operating according to the principle of ferro-resonance. These bistable state circuits are comprised of reactive elements, thus obviating the necessity of employing vacuum tubes in the counting circuit. As a result of this, the reliability and practicality of a counter arranged according to this invention is greatly enhanced, since capacitors and inductors, in comparison to vacuum tubes, are much more endurable, less bulky, and less expensive components. In adidtion, the power requirement of the counting circuit of the present invention is substantially decreased as compared to vacuum tube counters. Since almost all the components are reactive, the major part of the power loss is that resulting from the copper loss in the inductor of the ferro-resonant circuit.

The present embodiment provides a further feature in that one of the ferro-resonant elements is provided for each digit to be counted. As will be disclosed, a decimal denominational order utilizes ten such basic elements, each representing a digit from zero to nine. This arrangement is highly desirable since it eliminates the need for the critical feed-back loops as required in the binary tube counters. Moreover, it enables the output indication for each digit to be taken directly from one of the bistable state circuits eliminating the requirement of special decoding matrices as required in the binary counters.

Still another advantage of the present invention is that it provides a highly flexible counting circuit wherein any range of counts can be provided for, it being merely necessary to insert or take away one of the bistable state stages to change the range of count. This feature results from the simplicity with which each stage is connected to its adjacent stage so as to form a ring counter.

Briefly, the preferred embodiment of the ring counting circuit of the present invention is comprised of a plurality of ferro-resonant bistable state circuits. One such bistable circuit is provided for manifesting each digit and the output of each circuit is coupled to the trigger input of the succeeding circuit so as to form an operative ring. An A. C. source applied through a common impedance means connects all the bistable state circuits in parallel. The A. C. source is such that when applied across the circuits in this manner, only one of the circuits can be in a resonant, i. e. a highly conductive state, the others necessarily being in a low conductive state.

An input conductor is provided which simultaneously applies electronic pulses to be counted onto symmetrical non-linear resistors which function as gates in the paths coupling the output of each bistable state circuit to the trigger input of the next in the ring. Each of these resistors operates to permit a pulsating D. C. current, generated by the bistable state circuit in a resonant condition, to flow through the trigger input circuit of the succeeding bistable state circuit only when the voltage across the resistor is biased by an electronic pulse on the input conductor. This pulsating D. C. current flow operates to damp the highly conducting bistable state circuit into a low conductive state, and, at the same time, triggers the following bistable states circuit into a highly conducting state, thus resulting in the counter stepping to the next count.

This invention will be better understood from the following description taken in connection with the accompanying drawings, and its scope will be pointed out in the appended claims.

Figures 2, 4:
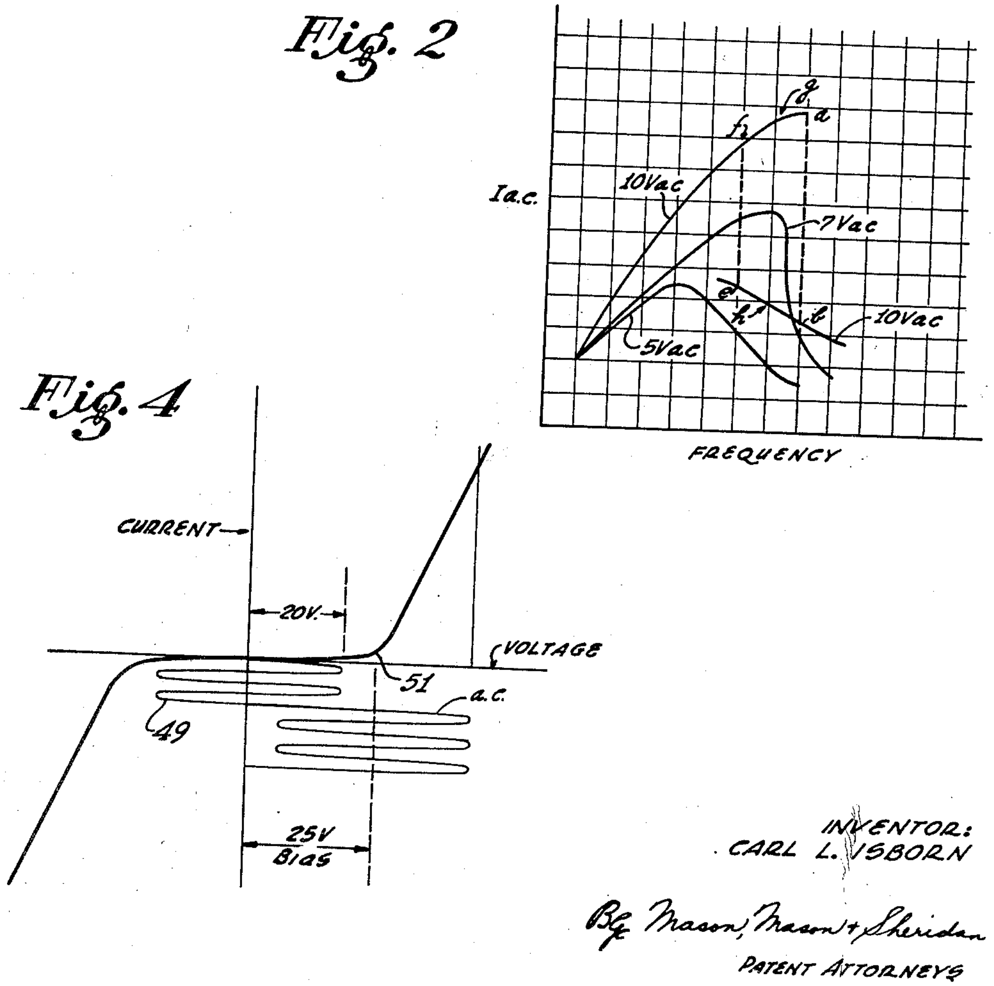
Figure 3:
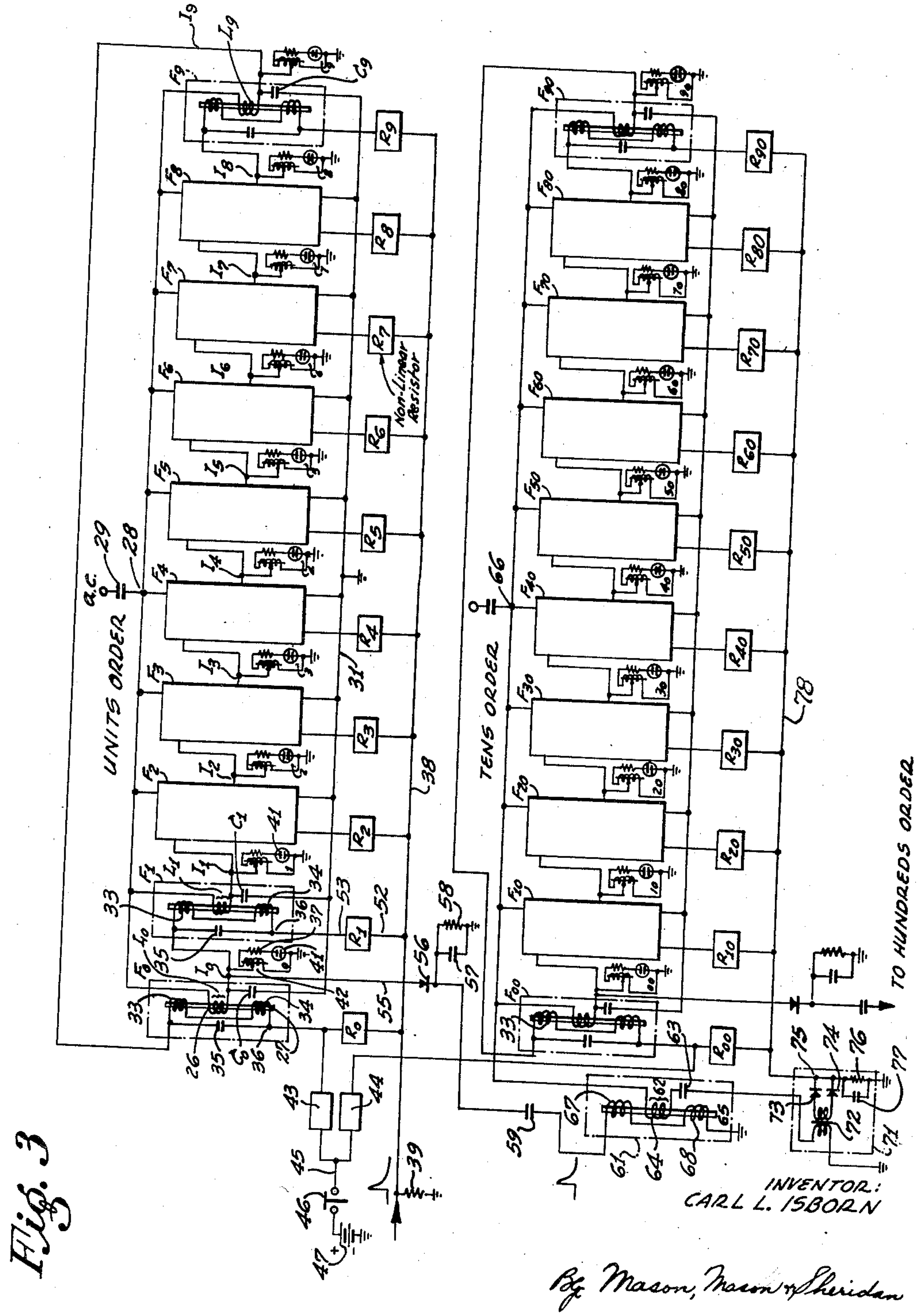

Referring to the drawings:

Figure 1 is an electrical circuit diagram illustrating the basic bistable state circuit of the present invention, Figure 2 is a graph for explaining the theory of operation of the circuit in Figure 1, Figure 3 is an electrical circuit diagram illustrating the preferred embodiment of the present invention, and, Figure 4 is a graph showing the operating characteristics of a symmetrical non-linear resistor which enables it to function as a gate in the circuit of Figure 3.

Referring to Figure 1, the basic bistable state circuit of the present invention will be first described. This circuit is shown to be a reactive circuit having a capacitor C in series with an inductor L. Inductor L is comprised of a solenoid or tubular coil 12 having a ferro-magnetic core 13. This core 13 is preferably composed of a thin elongated strip of metal whose permeability decreases over a considerable range with increasing changes in flux density.

A low impedance A. C. source of potential is applied to the capacitor end of this series reactive circuit, the inductor end thereof being returned to the source through ground.

First and second trigger input leads 14 and 15, respectively, are provided for illustrating the manner in which the basic bistable state circuit may be triggered from one stable state to the other. First trigger input lead 14 is connected to a trigger coil 16 having a large number of windings around core 13. The other end of trigger coil 16 is grounded. For preventing the A. C. frequency, induced by the flux in core 13, from being reflected back into the first trigger input lead 14, an RF choke coil 17, for example, is inserted therein. Second trigger input lead 15 is connected through a damping diode 18, preferably to the common junction 19 between capacitor C and inductor L. An RF choke coil 21 is placed in second input lead 15 for similarly preventing A. C. signals in the LC circuit from being reflected back into the lead. An output coil 22, also wound about core 13, provides the means by which an output voltage indicative of the state of the circuit is obtained. One end of output coil 22 is grounded and the other end is connected to an output lead 23.

In order to undersand the nature of the two stable states of equilibrium this basic circuit can assume, consider the current versus frequency curves shown in Figure 2. These curves represent the operating characteristic of the basic circuit with applied voltage as a parameter. As noted in the curves, the resonant frequency, i. e., the frequency of the peak current flow, increases as the A. C. voltage increases from 5 to 7 volts. This change in the resonant point frequency is due to the increase in current through the coil 12 due to the higher applied supply voltage. As a consequence of this increased current flow, the permeability of the core 13 decreases and a corresponding change occurs in the effective inductance of the inductor L. Thus the resonant frequency changes to a higher frequency.

Note that the declining part of each constant A. C. voltage curve in the graph becomes sharper and sharper as the voltage increases until at 10 volts there is a definite drop after the peak, such as shown at point *a*, where the current flow suddenly falls to a lower stable point *b*. This is due to the fact that as the frequency increases, the larger series resonant current can no longer cause a corresponding reduction in the effective inductance of L. The result of this phenomenon is that the current starts to drop and the inductance of L starts to increase.

The effect is a positive regeneration which ultimately settles at a low current flow, such as point *b*. If the frequency is now still further increased, the current flow still further decreases, as shown by the lower portion of the 10 volt curve. It should be noted that the 7 volt curve also shows effect of positive regeneration, but in this case the effect is not strong enough to cause as definite a drop after the peak. Any A. C. voltage curve of 10 volts or more, for the plot in Figure 2, has this characteristic abrupt drop in current flow.

Now if the lower portion of the 10 volt curve is retraced by reducing the frequency, it will be found that the current will not suddenly increase at the same frequency at which it sharply dropped. Instead it will slowly rise until at a point, such as *e*, where it will suddenly increase. The reason for this delay in the jump is that the current at point *b* is low, the effective inductance of L is large, and the apparent resonant frequency is much lower than point *a*. As the frequency is continually decreased, however, the current will steadily rise as this apparent resonant point is approached until the point, such as *e*, is reached on the graph. Here the current will be large enough that it tends to saturate the core 13 resulting in a reduction in the effective inductance of L. The reduction of this inductance raises the apparent resonant point, thus increasing the current and consequently decreasing the inductance again, etc., until the current flow jumps up to the value represented by point *f*.

Any pair of points of constant frequency, such as point *g* on the upper 10 volt curve and point *h* on the lower 10 volt curve, are possible points of operation in the region of bistability; that is, once the circuit of Figure 1 is at point *g*, for example, it will stay there with a high current flow through its inductor L and capacitor C until the circuit is properly triggered to place it in the other state defined by point *h*. A neon bulb 24 connected in series with a resistor 25 across capacitor C, for example, is provided for indicating the state of the circuit. This bulb 24 is lit only when the circuit is in the high current conducting state.

On examining the two stable states of Figure 2, it should be noted that when operating at a point on the upper 10 volt curve, such as point *g*, the relative values of the circuit elements are such that the circuit is predominantly capacitive; and when operating at a point on the lower 10 volt curve, such as point *h*, the relative values of the circuit elements are changed, as a result of the non-linear inductor, so that the circuit is now predominantly inductive. Thus the flipping of the operation of the circuit from a high current flow to a low current flow may be described as a flipping from one side of a fictitious resonant point to the other.

Assuming the circuit is operating according to the 10 volt characteristic curve and with an A. C. fixed frequency defined by line *g*—*h*, the manner of triggering the basic bistable state circuit will next be described for the purpose of further clarifying the circuit operation.

When the 10 volt A. C. is first applied to the circuit of Figure 1, it may settle in either of the two states of equilibrium. Assume that the circuit is initially in stable state *g* with a high current conduction. If a positive pulse is applied on second trigger input lead 15, the current flow through the coil 12 of the inductor L is damped. Since the core 13 of inductor L is no longer saturated, the effective inductance increases, and the circuit operation drops to point *h* of the curves in Figure 2. The circuit is now in its opposite stable state and will stay there until triggered by a positive pulse on the first trigger input lead 14. This latter pulse tends to saturate the core 13. As a result, the effective inductance of inductor L decreases and the LC circuit is brought toward a resonant condition which increases the current conduction and flips the circuit to point *g* of the curve in Figure 2. Thus, it is seen that a pulse on the first trigger input lead 14 flips the series reactive circuit to a high current conduction state and a pulse on the second trigger input lead 15 flips the circuit to a low current conduction state. The state of the circuit is evidenced by the relative magnitude of the A. C. voltage swing on output lead 23.

It should be understood that the description and operation of the basic bistable state circuit as above described is not a part of the teachings of the present invention, this circuit having been described in a copending application, Serial No. 175,784, of Carl L. Isborn, filed July 25, 1950.

Referring next to Figure 3, the electrical circuit of the counter of the present invention is shown. This preferred embodiment represents a decade counter wherein each order is comprised of ten bistable state circuits. Each of these circuits operates according to the principle of ferro-resonance as described in connection with Figure 1. Thus the units order decade is comprised of circuits $F_0$ to $F_9$, inclusive; and the tens order decade is comprised of circuits $F_{00}$ to $F_{90}$, inclusive. Referring to the units order decade, circuit $F_0$ is comprised of an inductor $L_0$ connected in series with a capacitor $C_0$. Inductor $L_0$ has a tubular coil 26 and a core 27 having the properties previously discussed in connection with Figure 1. Each of the other bistable state circuits in the decades is comprised of an inductor and capacitor having the same value as those in the $F_0$ circuit. The inductor ends of each of these circuits in the units order decade is connected to a common junction 28 which is connected to a low impedance A. C. source by means of a common capacitor 29. The capacitance ends of each of the bistable circuits are connected to a common line 31 which is returned to the A. C. source through ground. It is thus evident that all the bistable state circuits are connected in parallel between common junction 28 and common line 31.

Wound about the core of each bistable state circuit, such as core 27 for circuit $F_0$ is a pair of trigger coils 33 and 34. These trigger coils are connected in series and wound in opposite directions on core 27 so as to provide a bucking arrangement for potentials induced in these coils by the A. C. current flowing through the inductor $L_0$ and capacitor $C_0$. Note that although the flux induced in core 27 by a trigger pulse impressed on trigger coils 33 and 34 would appear to be cancelled out by this arrangement, actually the effective inductance of inductor $L_0$ decreases because of a decrease in mutual inductance between the windings on the tubular coil 26 of the inductor $L_0$. This decrease in mutual inductance is sufficient to trigger the $L_0C_0$ circuit to its highly conducting state. A capacitor 35 provides a high frequency shunt path across the trigger coils 33 and 34. A junction 36 which joins capacitor 35 to trigger coil 34 is connected through a symmetrical non-linear resistor $R_0$ to a common input conductor 38 on which the electronic pulses to be counted are received. Conductor 38 is connected to ground by means of a resistor 39. Each of the other bistable state circuits $F_1$ to $F_9$, inclusive, have similar trigger circuits and each of their junctions, such as junction 36, is connected to input conductor 38 by means of one of the symmetrical non-linear resistors $R_1$ to $R_9$, respectively.

The intermediate point between the inductor and capacitor of each of these circuits has an output lead, such as $I_0$ for circuit $F_0$, which connects to the input end of the trigger coil of the following circuit, such as trigger coil 33 of circuit $F_1$. Thus note that the output of circuit $F_9$ is connected to the trigger coil 33 of circuit $F_0$ by an output lead $I_9$, resulting in the circuits in the units order being interconnected to form a continuous ring.

In order to indicate the count, each of the circuits $F_0$ to $F_9$, inclusive, has connected to its output a neon lamp 41 and an auto-transformer 42. Referring to the $F_0$ circuit, one end of the auto-transformer 42 is connected to output line $I_0$ and the other end is connected to ground. The neon bulb 41 in series with a limiting resistor 37 is connected across the output of the auto-transformer 42. The auto-transformer 42 functions to sufficiently raise the potential across neon lamp 41 so as to ignite it whenever the $F_0$ circuit is in the high current condition. It should be noted that the use of the auto-transformer 42 results in minimizing the load on the $F_0$ circuit due to the neon bulb. This is desirable since too high a degree of loading would cause the $F_0$ circuit to trigger into a low conductive state.

Referring to the units order decade, the reactance of the common capacitor 29 is so selected that when the A. C. supply is first connected across the bistable state circuits $F_0$ to $F_9$, inclusive, only one of the bistable state circuits may be in the ferro-resonant condition, i. e., draw a high current from the A. C. supply, at a time. If two or more bistable state circuits should attempt to draw a high value of current from the A. C. supply at the same time, the voltage at common junction 28 would drop to such a low value, due to the added voltage drop across common capacitor 29, that none of the circuits would have sufficient voltage across them to enable them to draw high current from the A. C. supply. On the other hand, if none of the circuits should go into resonance, the voltage at common junction 28 would rise to such a value that one of the circuits should be forced to break down and go into a resonant conducting state.

Before the ring decade counter starts counting input pulses received on input conductor 38, it must be reset to a zero indication as evidenced by the $F_0$ circuit in the units order decade and the $F_{00}$ circuit in the tens order decade drawing a high current from the A. C. supply. In order to accomplish this action, a D. C. reset pulse is impressed on line 45 which is connected to the trigger coils 33, 34 of each of the $F_0$ and $F_{00}$ circuits by means of symmetrical non-linear resistors 43 and 44, respectively. The manner in which resistors 43 and 44 serve to pass the reset pulses and at the same time isolate the decade order counters will be made clear in the ensuing discussion in connection with Figure 4. The reset pulse is obtained, for example, by the momentary closing of switch 46 which connects a D. C. power supply 47 to line 45. Referring to the units order decade, this D. C. reset pulse passes through the coils 33 and 34 of circuit $F_0$, thence by line $I_9$ through the auto-transformer 42 associated with the $F_9$ circuit, and then to ground. As a result of energizing trigger coils 33 and 34, the reset pulse tends to saturate core 27, thus triggering the $F_0$ circuit into a high current state.

The operation of the input circuit means, which enables the input pulses on input conductor 38 to be counted by causing the circuits in the ring decade to be triggered into a resonant condition one at a time in sequence, will next be described.

Referring first to Figure 4, a plot is shown of the variation in the amount of current that will be passed through one of the symmetrical non-linear resistors, $R_0$ to $R_9$, inclusive, with a variation in applied voltage.

When one of the bistable state circuits, for example circuit $F_0$, has a high current conduction therethrough, a relatively large A. C. potential swing of, say, 20 volts, is sensed on its output lead $I_0$. Since coils 33 and 34, of the following bistable state circuit $F_1$, to which lead $I_0$ is connected, presents a high impedance to this high frequency voltage, the signal passes through shunt capacitor 35 in the $F_1$ circuit, and through symmetrical non-linear resistor $R_1$, to the common input conductor 38. As will be noted by reference to Figure 4, substantially no current will flow through resistor $R_1$ with a potential of 20 volts across its terminals. This 20 volt swing is indicated by waveform 49. Thus it is seen that under these operating conditions the units order decade is in a stable condition, since the high voltage swing on input lead $I_0$ does not drive current through the trigger coils 33 and 34 of circuit $F_1$, and the circuit $F_0$, in turn, is not loaded. It should be noted that when the $I_0$ output has a relatively large A. C. potential thereon, all the other outputs $I_1$ to $I_9$, inclusive, have a relatively lower A. C. potential. Consequently the associated symmetrical non-linear resistors have even less current flow therethrough than resistor $R_1$ under these conditions. The graph of Figure 4 shows that after point 51, which represents a voltage across the resistor of substantially 25 volts, an appreciable amount of current flows through the resistor as a linear function of the applied voltage.

Referring to Figures 3 and 4, the operation of the units ring decade will now be described when a D. C. input pulse having an effective value of, say 25 volts, is impressed on input conductor 38. This D. C. input pulse is simultaneously applied to all the symmetrical non-linear resistors $R_0$ to $R_9$, inclusive. Thus, side 52 of each of the resistors, such as resistor $R_1$, has an applied D. C. voltage of 25 volts. Assuming the $F_0$ circuit is in a highly conductive state, the output lead $I_0$ has a large A. C. voltage while all the other output leads have a substantially lower A. C. voltage thereon. The effect of the D. C. input pulse on side 52 of resistor $R_1$ is such as to bias the voltage swing of the A. C. output potential across resistor $R_1$, as shown in Figure 4. As a result, a pulsating D. C. current flows, for the duration of the input pulse, through the series path comprised of resistor $R_1$, trigger coils 34 and 33 in the $F_1$ circuit, connection $I_0$, and finally to ground through the auto-transformer 42. The effect of biasing resistor $R_1$, so as to permit current to flow through this series path for the duration of the input pulse, accomplishes two functions. It serves to load circuit $F_0$, thus damping this circuit from a resonant to a low conducting state. At the same time, the pulsating direct current, which is effectively filtered by bypass capacitor 35, flows through trigger coils 33 and 34 of circuit $F_1$. The D. C. current flow through these trigger coils operates to decrease the effective inductance of circuit $F_1$, resulting in triggering it to a high conductive state.

The operation of the non-linear resistors, such as resistor $R_1$, is thus seen to be similar to that of a gate. When the resistor is impressed by a symmetrical A. C. potential having a value below the threshold at which the resistor conducts heavily, the current flow is substantially cut off. However, when biased by a D. C. pulse, the operation of the non-linear resistor shifts to the highly conducting region, resulting in a pulsating D. C. current flow therethrough.

It is now evident that when the $F_0$ circuit is in a highly conducting state, an input pulse on common input conductor 38 results in the $F_1$ circuit being triggered into a highly conducting state and the $F_0$ circuit simultaneously being triggered into a low conducting state. This change is visually manifested in the counting circuit by the neon lamp 41 becoming illuminated in circuit $F_1$ and being extinguished in circuit $F_0$.

The D. C. input pulse impressed on common input conductor 38 which may, for example, be a differentiated pulse, must be of sufficient width to effectively bias the A. C. potential applied across the non-linear resistors. As shown in Figure 4, an input pulse width equal to at least three cycles of the potential from the A. C. source is preferable. It should be noted, however, that a pulse too long in duration may cause the ring counter to miss a count by skipping. This results from the fact that the input pulse maintains the common input conductor 38 at a high potential, thus continuing to bias the non-linear resistors after the bistable circuits have triggered to their new conditions, resulting in the triggering operation repeating itself.

Thus it is noted that each succeeding D. C. input pulse impressed on input conductor 38 is simultaneously applied to all of the resistors $R_0$ through $R_9$, inclusive, but the only one of these resistors that will pass the D. C. pulsating current flow needed to advance the counting ring is the resistor connected to the output of the bistable state circuit that is drawing a high value of current from the A. C. supply.

In a similar manner to that described above, the count indication progresses, in sequence, to the condition where the circuit $F_9$ is in a high current state and its neon lamp manifesting the digit 9 is illuminated. The next input pulse on common input conductor 38 causes the circuit $F_0$ to again start drawing a high current from the A. C. supply, lighting up the neon lamp manifesting the digit 0, in circuit $F_0$, and damping the $F_9$ circuit into a low current state. At the time that circuit $F_0$ is triggered to a high current conducting state, the high A. C. potential swing sensed on output $I_0$ is applied through a pulse carry line 55 to a diode 56. This A. C. is rectified by diode 56 and smoothed by a filter capacitor 57 connecting the output of the diode 56 to ground. As a result of this action, a waveform having an abrupt positive change in potential is provided. However, a resistor 58 bridging capacitor 57 serves to create an attenuated trailing edge on the waveform generated at the output of diode 56. As a result of this, the leading edge of the waveform, when differentiated by coupling capacitor 59, provides a steep positive pulse, while the differentiation of the trailing edge of the waveform is ineffective. This positive differentiated pulse is applied on a magnetic amplifier 61 provided in the input circuit of the tens order ring decade.

Thus every time the $F_0$ circuit in the units order ring decade is triggered into a high conducting state, a carry pulse is applied on the input to the tens order ring decade.

The magnetic amplifier 61 is comprised of an inductor 62 connected in series with a capacitor 63. Inductor 62 has a coil 64 wound on a magnetic core 65. The coil 64 is connected to the A. C. supply by way of the common junction 66 of the tens order decade. It should be understood that the tens order decade is arranged similarly to the units order decade. The differentiated carry pulse from coupling capacitor 59 is impressed upon a pair of serially connected trigger coils 67 and 68 wound in opposition on the core 65 and connected to ground.

These trigger coils are arranged to operate similarly to that described for the circuits $F_0$, $F_1$, etc.

It should be noted, however, that magnetic amplifier 61 does not function as a ferro-resonant bistable state circuit. Rather the inductor 62 and series capacitor 63 thereof is designed to function as a ringing circuit which when energized by the differentiated carry pulse provides an A. C. envelope output having a period of the proper width to effectively bias the non-linear resistors $R_{00}$ to $R_{99}$, inclusive, as explained in Figure 4.

The output of magnetic amplifier 61 provides a low impedance signal which, after passing through pulse shaping circuit 71, is used to trigger the tens order decade to indicate the next digit count. This low impedance signal is impressed upon the primary winding of a transformer 72 in the pulse shaping circuit 71. The secondary winding of transformer 72 has its terminals connected to the anode ends of two diodes 73 and 74, whose cathode ends are connected to a point 75. Diodes 73 and 74 function to fully rectify the A. C. signal induced in transformer 72 by magnetic amplifier 61. A resistor 76 shunted by capacitor 77, which connects point 75 to ground, serves to filter this signal before it is impressed on the common input conductor 78 of the tens order decade.

From the above description of the preferred embodiment of the present invention it will be evident that the invention may be readily adapted to have as many as 20 or more ferro-resonant bistable circuit elements arranged in a ring. Thus an input pulse stream may be divided by any integer 1 through 20 or more by connecting the proper number of elements in the ring.

While the circuits as shown and described herein are admirably adapted to fulfill the objects and features of advantage previously enumerated as desirable, it is to be understood that the invention is not to be limited to the specific features shown, but that the means and construction herein disclosed are susceptible of modification in form, proportion, and arrangement of parts without departing from the principle involved or sacrificing any of its advantages and the invention is therefore claimed in embodiments of various forms, all coming within the scope of the claims which follow.

What is claimed is:

1. An electrical counting circuit comprising, in combination: a plurality of reactive bistable state circuits each having an output and a trigger input; means for connecting an A. C. source across said reactive circuits through a common impedance means having such a value that one of said circuits is uniquely operated in one stable state and the remaining circuits are operated in the opposite stable state; means for coupling the output of each reactive circuit to the trigger input of the following circuit to thereby form a continuous ring; a common input conductor for supplying electrical pulses to be counted; and means connecting said common input conductor to each of said coupling means for enabling the reactive circuits in said ring to be sequentially triggered into said unique stable state in response to successive electrical pulses on said common input conductor.

2. A sequence operated ring counter for electrical pulses comprising: a plurality of ferro-resonant bistable state circuits each having an output and a trigger input; means for connecting an A. C. source across said ferro-resonant circuits through a common impedance means having such a value that only one of said ferro-resonant circuits may operate in a highly conductive state at any one time, the other circuits necessarily operating in a low conductive state; means for coupling the output of each ferro-resonant circuit to the trigger input of the following circuit to form a continuous ring; means for supplying input pulses to be counted; and means included in each of said coupling means for enabling the highly conducting ferro-resonant circuit to trigger the following ferro-resonant circuit in the ring into a highly conductive state with the aid of said input pulses.

3. An electronic counting system for electrical pulses comprising: a plurality of bistable state circuits whose states are characterized by maximum and minimum current flow therethrough; means for connecting an A. C. source across said circuits through a common impedance means having such a value that only one of said bistable state circuits can have a maximum current flow therethrough at a time; an input conductor for supplying electrical pulses to be counted; means coupling the output of each of said circuits to the input of the next so as to form a continuous ring; said coupling means including means conditioned by a bistable state circuit when in a maximum current flow condition to cause the following bistable circuit in the ring to be triggered into a maximum current flow condition in response to an electrical pulse on said input conductor.

4. An electrical counting circuit comprising in combination: a plurality of ferro-resonant bistable state circuits connected in parallel, each of said circuits having an output and a trigger input; means including an A. C. electrical potential connected across said ferro-resonant circuits for causing one of said circuits to be operated in a stable state with a high A. C. voltage output and the remaining circuits to be operated in a stable state with a low A. C. voltage output; a common input conductor for supplying electrical pulses to be counted; a path comprising a capacitor in series with a non-linear resistor for connecting the output of each ferro-resonant circuit to said common input conductor; and means for connecting across the capacitor in the output path of each of said circuits the trigger input of the following circuit; whereby each of said non-linear resistors operates to pass energy through the trigger input of said following circuit only when the output of the circuit connected thereto has a high A. C. voltage and an electrical pulse is impressed on said common input conductor, and whereby said following circuit is triggered into the state with a high A. C. voltage output.

5. An electronic counting system for electrical pulses comprising: a plurality of bistable state circuits connected in parallel; a common impedance means connecting said parallel circuits to a source of alternating current having such a value that after the voltage drop through said common impedance means one of said bistable state circuits is in a highly conductive state and the remaining circuits are in a low conductive state; a common input conductor for supplying electrical pulses to be counted; means interconnecting the output of each bistable state circuit to the trigger input of the following circuit to thereby form a continuous ring; and other means connecting the trigger input of each circuit to said common input conductor and operable in response to pulses on said input conductor to energize the associated interconnecting means, whereby the highly conductive circuit in the ring is triggered to a low conductive state and the succeeding circuit is triggered to a highly conductive state.

6. An electronic counting system for electrical pulses including: a plurality of bistable state reactive circuits connected in parallel, each of said reactive circuits comprising a capacitor and an inductor; a common impedance means connecting said parallel reactive circuits to a source of alternating current having such a value that after the voltage drop through said common impedance means one of said reactive circuits is in a highly conductive state and the remaining reactive circuits are in a low conductive state; means coupling the output of each of said reactive circuits to the input of the next so as to form a continuous ring; a common input conductor for supplying electrical pulses to be counted; and means controlled by electrical pulses received on said input conductor for causing current in the highly conductive reactive circuit to be diverted into the input of the following reactive circuit in the ring, whereby said highly conductive reactive circuit is damped to a low conductive state and said following reactive circuit is triggered into a highly conductive state.

7. A sequence operated ring counter for electrical pulses including: a plurality of branch circuits each comprising a capacitor in series with an inductor having a ferro-magnetic core; a conductor connecting the inductor ends of said branch circuits together to a common junction; another capacitor connected to said common junction; other means connecting said last mentioned capacitor and the capacitor ends of said branch circuits to a source of alternating current whose frequency and voltage are such as to operate said branch circuits in the region of their bistable ferro-resonant condition, said last mentioned capacitor having an impedance such that only one of said branch circuits of the series-parallel circuit thus formed may operate in a high current condition at any one time; a saturating coil for each of the inductors of said branch circuits; gating means coupling the common junction of the inductor and capacitor of each of said branch circuits to the saturating coil of the following branch circuit; and an input conductor for supplying electrical pulses to be counted to each of said gating means; whereby said gating means is operable in response to an electrical pulse on said input conductor to load the branch circuit in a highly conductive state and cause current to flow through the saturating coil of the following branch circuit, thereby causing said latter branch circuit to be triggered into a highly conductive state.

8. A sequence operated ring counter for electrical pulses including: a plurality of branch circuits each comprising a capacitor in series with an inductor having a ferro-magnetic core; a conductor connecting the inductor ends of said branch circuits together to a common junction; another capacitor connected to said common junction; other means connecting said last mentioned capacitor and the capacitor ends of said branch circuits to a source of alternating current whose frequency and voltage are such as to operate said branch circuits in the region of their bistable ferro-resonant condition, said last mentioned capacitor having an impedance such that only one of said branch circuits of the series-parallel circuit thus formed may operate in a high current condition at any one time; a pair of trigger coils wound in opposition on the cores of each of the inductors of said branch circuits; a path connecting the common junction of the inductor and capacitor of each branch circuit to the trigger coils of the following branch circuit; a symmetrical non-linear resistor coupled to each of said paths; and a common input conductor connected to each of said resistors for supplying electrical pulses to be counted; whereby each of said resistors is operable when biased by an electrical pulse on said common input conductor to pass a pulsating D. C. current through the path connecting the branch circuit in a highly conductive state to the trigger coils of the following branch circuit.

9. An electronic counting system for electrical pulses comprising in combination: a plurality of single pathed bistable state circuits connected in parallel, each of said bistable state circuits having an output and a trigger input; a common impedance means connecting said bistable state circuits to a source of alternating current having such a value that one of said bistable state circuits is in a highly conductive state and the remaining circuits are in a low conductive state; a common input conductor for supplying electrical pulses to be counted; means interconnecting the output of each bistable state circuit to the trigger input of the following circuit; other means including a capacitor connecting the trigger input of each bistable state circuit to said common input conductor, said latter means operable in response to pulses on said input conductor to energize the means interconnecting the highly conductive bistable state circuit to the trigger input of the succeeding circuit, whereby the highly conductive circuit is triggered to a low conductive state and the succeeding circuit is triggered to a highly conductive state.

10. An electrical counting circuit comprising in combination: a plurality of bistable state reactive circuits connected in parallel, each said reactive circuit comprising a capacitor and an inductor; a trigger circuit for each of said inductors comprising a saturation coil and a shunt capacitor; a common impedance means connecting said parallel reactive circuits to a source of alternating current having such value that said circuits are operated in the bistable region of their frequency-voltage characteristic in which a state of high-current conduction obtains in one of the reactive circuits of said plurality and a state of low-current conduction obtains in the other reactive circuits of said plurality; a coupling circuit connecting the output of each reactive circuit to the trigger circuit of the following; means for supplying electrical pulses to be counted; and means for connecting said supply means to all of said trigger circuits, each of said latter means being operable to cause pulsating D. C. current to flow through the coupling circuit connecting the high current condition reactive circuit to the saturation coil of the following reactive circuit when biased by an electrical pulse from said supply means, whereby the condition of high current conduction is shifted to said following reactive circuit.

11. An electrical counting circuit comprising in combination: a plurality of branch circuits, each comprising a capacitor in series with an inductor having a ferro-magnetic core; a conductor connecting the inductor ends of said branch circuits together to a common junction; another capacitor connected to said common junction; other means connecting said last mentioned capacitor and the capacitor ends of said branch circuits to a source of alternating current whose frequency and voltage are such as to operate said branch circuits in the region of their bistable ferro-resonant condition, said last mentioned capacitor having an impedance such that only one of said branch circuits of the series-parallel circuit thus formed may operate in a high current condition at any one time; a pair of serially connected trigger coils wound in opposition on the cores of each of the inductors of said branch circuits; a capacitor shunting each of said serially connected trigger coils; a path connecting the common junction of the inductor and capacitor of each branch circuit to one end of the shunt capacitor of the following branch circuit; a symmetrical non-linear resistor connected to the other end of each of said shunt capacitors; and a common input conductor connected to each of said resistors for supplying electrical pulses to be counted, whereby each of said resistors is operable when biased by an electrical pulse on said input conductor to cause a pulsating D. C. current to flow through the path connecting the branch circuit in a highly conductive state to the trigger coils of the following branch circuit.

12. A ring element capable of being connected to an A. C. source through a common impedance in parallel with others of a similar nature to form a ring counter including in combination: a reactive circuit comprising a capacitor in series with an inductor having a magnetic core; a first and second input terminal for connecting said circuit to said A. C. source; a pair of serially connected trigger coils wound in opposition on said core; a capacitor shunting said trigger coils; a third input terminal connected to one side of said shunt capacitor for receiving the output from a similar ring element; a fourth input terminal for receiving pulses to be counted; a symmetrically non-linear resistor connecting said fourth input terminal to the other side of said shunt capacitor; and an output terminal connected to the common junction of the capacitor and inductor of said reactive circuit.

References Cited in the file of this patent

UNITED STATES PATENTS

| Number | Name | Date |
|---|---|---|
| 2,519,513 | Thompson | Aug. 22, 1950 |
| 2,524,154 | Wood | Oct. 3, 1950 |
| 2,536,035 | Cleeton | Jan. 2, 1951 |
| 2,591,406 | Carter et al. | Apr. 1, 1952 |